June 15, 1965 A. H. BOHR 3,188,800
HELICAL-TYPE TURBOJET ENGINE

Filed May 12, 1960 4 Sheets-Sheet 1

INVENTOR
ALEXANDER H. BOHR
BY
Curtis, Morris & Safford
ATTORNEYS

June 15, 1965 A. H. BOHR 3,188,800
HELICAL-TYPE TURBOJET ENGINE
Filed May 12, 1960 4 Sheets-Sheet 2
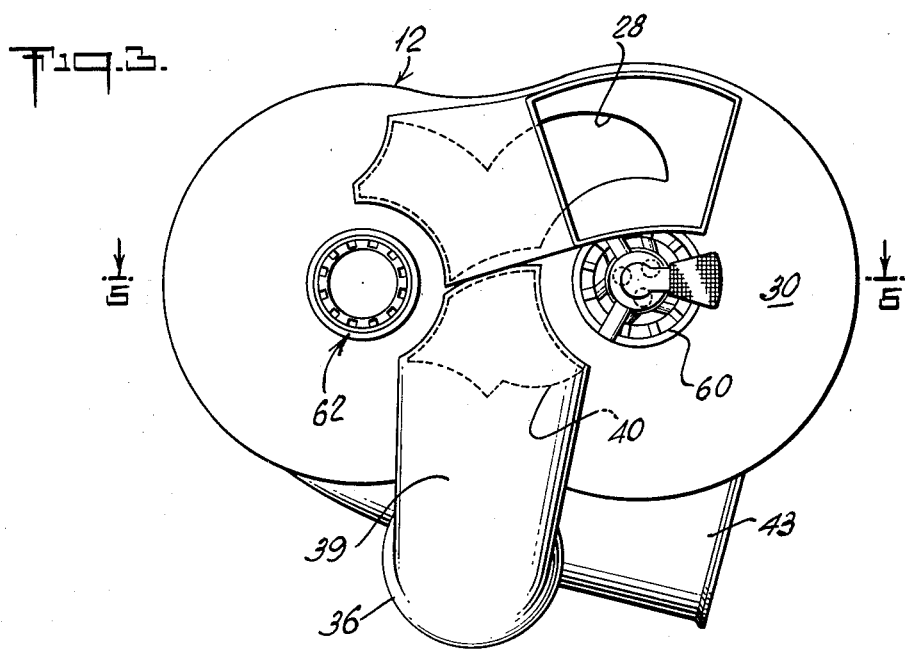
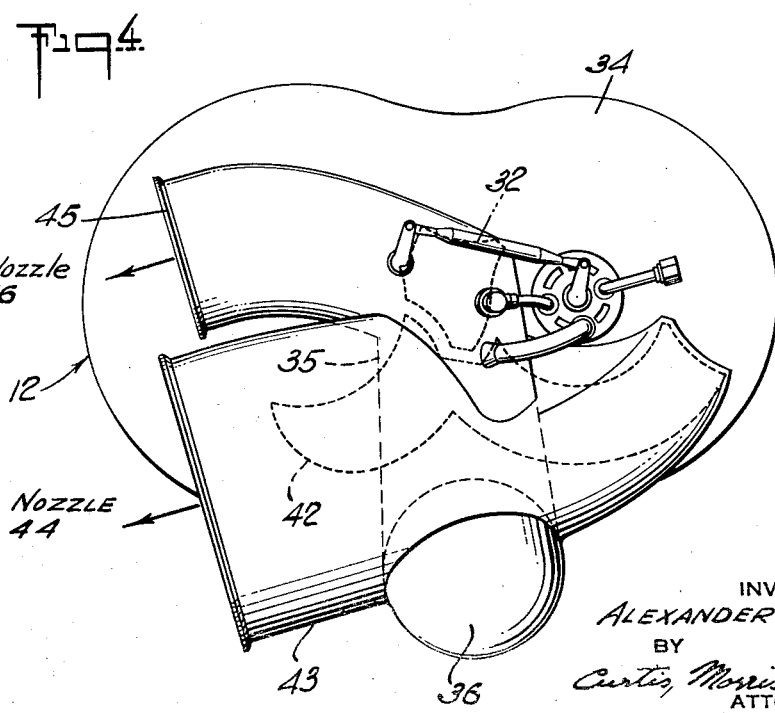
INVENTOR
ALEXANDER H. BOHR

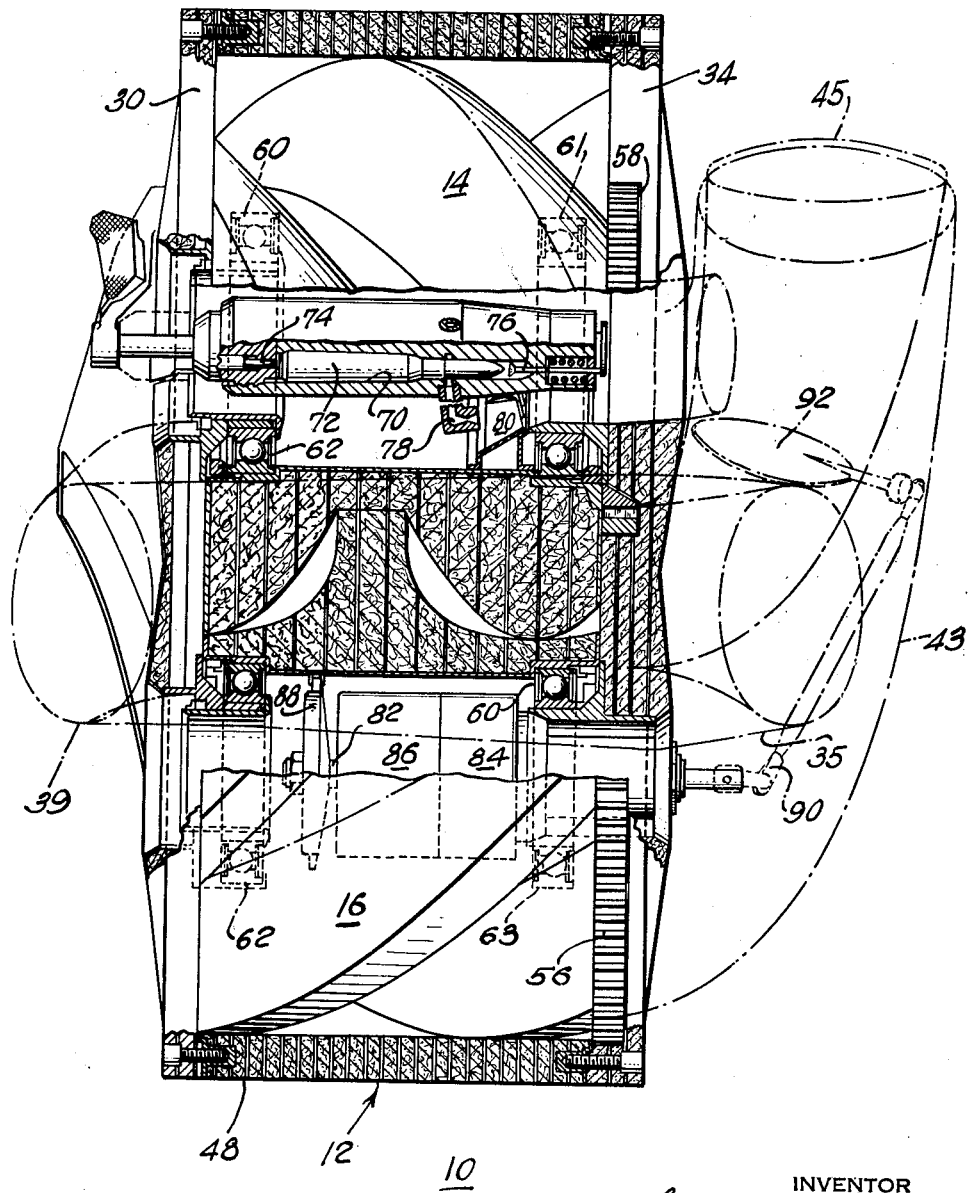

June 15, 1965  A. H. BOHR  3,188,800
HELICAL-TYPE TURBOJET ENGINE
Filed May 12, 1960  4 Sheets-Sheet 4

INVENTOR
ALEXANDER H. BOHR
BY
Curtis, Morris & Safford
ATTORNEYS

United States Patent Office 3,188,800
Patented June 15, 1965

3,188,800
HELICAL-TYPE TURBOJET ENGINE
Alexander H. Bohr, Sparta, N.J., assignor to Thiokol Chemical Corporation, Bristol, Pa., a corporation of Delaware
Filed May 12, 1960, Ser. No. 28,667
2 Claims. (Cl. 60—35.6)

This invention relates to an engine of the gas exhaust type.

An object of this invention is to provide a very lightweight, portable jet engine which is able to produce a very high thrust in proportion to its weight.

Another object is to provide a jet engine which is very efficient in fuel consumption at full thrust and which maintains good efficiency even near zero thrust.

A further object is to provide an engine of this kind which is relatively simple and inexpensive to build and which is mechanically rugged and reliable.

These and other objects will in part be understood from and in part pointed out in the following description.

A typical jet engine has a bladed compressor which is rotated at high speed to draw air in, burn it with fuel in a combustion chamber and pass the hot gases through an exhaust nozzle to obtain a net gain in thrust. Usually the compressor is driven by an after-turbine which extracts part but not all of the available power from the gases being exhausted from the engine. One difficulty with this kind of engine is that it must operate near full thrust to obtain reasonable fuel efficiency in relation to the thrust produced. Though the engine may be operated at slower speed and thrust decreased, the amount of fuel burned per minute at low speed remains very near the full speed value of fuel consumption. This results in a drastic and often prohibitive loss in efficiency and is an undesirable limitation on the usefulness of this kind of engine.

A second difficulty with a bladed compressor type of jet engine is that its parts are of necessity operated at high temperatures and speeds. This makes it necessary to build these parts of special high temperature alloys and to machine them to extremely fine tolerances. Moreover, to guard against wear and part failure frequent maintenance and inspection of the engine is required. The present invention is intended to minimize these problems.

In accordance with the present invention in one specific embodiment, there is provided a positive displacement gas exhaust engine using a twin rotor screw compressor, generally of the Lysholm type, uniquely arranged to operate simultaneously as a gas expander producing the same effect as a turbine. The two rotors are aligned parallel to each other within a housing and rotate in opposite directions. One rotor has projecting shoulders somewhat like screw threads of exaggerated pitch, which mate in corresponding grooves in the other rotor. As the two rotate, the shoulders and grooves act continuously to squeeze gas introduced at one end of the rotors and to move it axially to the other end where the gas is discharged with substantially increased pressure.

Visualizing this unit as divided into an upper and lower portion by a plane common to the axes of the rotors, the length of the rotors and the pitch of their shoulders and grooves are designed so that the upper portion, for example, functions as a compressor or pump and the lower portion as an expander or motor. When the rotors turn, their shoulders and grooves come together in the upper portion of the unit and in the process of meshing with each define a volume or volumes beginning at one end and being progressively moved axially and squeezed down in size toward the other end. Gas admitted to these volumes at the input ends of the rotors is thus compressed and exhausted out the other end. Beneath the dividing plane in the lower portion of the unit the shoulders and grooves of the rotors are turning away from each other, and so the volumes between them progressively increase in size from the input end to the output end of the rotors. Thus by supplying the lower part of the unit with sufficient power in the form of heated and compressed gas, the upper part can be driven as a compressor. To accomplish this, part of the flow of gas from the compressor is passed to a combustion chamber where its temperature, and correspondingly its work energy, is greatly increased. This high temperature compressed gas is then introduced to the motor section of the unit where the gas by expanding drives of the rotors with sufficient power to meet the energy requirements of the compressor and to supply frictional and other driving losses. By suitable porting design the mean gas pressure in the motor section exceeds that in the compressor section to overcome the frictional and other driving losses. This gas after passing through the motor section is exhausted to produce a secondary jet, the main exhaust jet being supplied by the gas from the compressor not passing through the motor.

The dual functioning of the rotors in this unit provides a considerable saving in weight and improvement in efficiency for a given power output. By making the rotors of special lightweight construction in accordance with another aspect of the invention, the overall weight of a unit including combustion chamber and fuel supply can, for example, be held to about 50 pounds and yet the unit will be powerful enough to give a static thrust of about 200 pounds. By using an afterburner this thrust can be increased to about 350 pounds without materially increasing the overall dead weight.

In accordance with a specific aspect of the invention, the rotors are made very light in weight and fabricated with a minimum of machining by constructing each from a stack of corrugated plates to give a honeycomb skeleton. This is then filled with a ceramic foam to give a rigid assembly having the desired shape and being suitable for operation at the temperatures and speeds encountered. To provide the grooves or shoulders on the rotors and to give them the proper pitch, each of the corrugated plates corresponds to a cross-section of its respective rotor. The plates are then stacked face-to-face upon each other in angularly displaced or skewed relation. This eliminates the need for elaborate final machining of the rotors and this considerably reduces cost as well as weight.

A better understanding of the invention together with a fuller appreciation of its many advantages will best be gained from the following description given in connection with the accompanying drawing wherein:

FIGURE 3 is an enlarged view of the input end of the rotors of the unit showing the shapes of the inlet port for the compressor and the inlet port for the motor portions of the unit;

FIGURE 4 is similar to FIGURE 3 but shows the output end of the rotors;

FIGURE 5 is a further enlarged section view of the unit taken along lines 5—5 in FIGURE 3 and with portions broken away;

Figure 1:
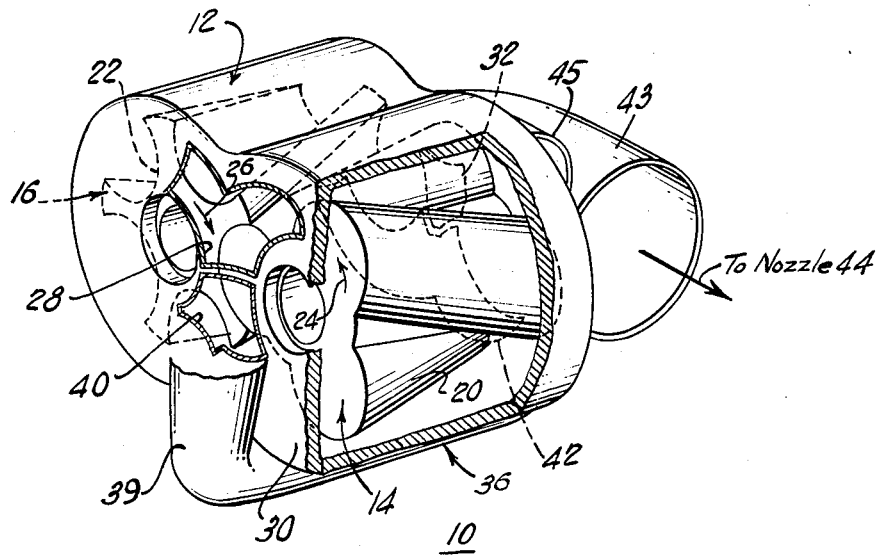
FIGURE 1 is a perspective view of a gas jet engine embodying features of the invention, certain parts of the unit being broken away.

The gas exhaust engine 10 shown in FIGURE 1 comprises a housing 12 within which are mounted a male rotor 14 and a female rotor 16. These are aligned parallel to each other and have mating shoulders 20 and grooves 22 which mesh when the rotors are driven in opposite directions, as indicated by the arrows 24 and 26 respectively.

Figure 2:
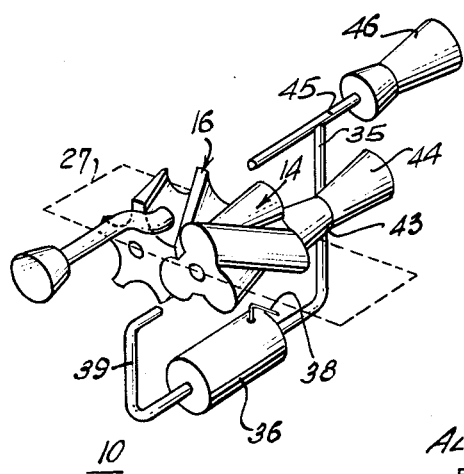
FIGURE 2 is a schematic representation of the unit shown in FIGURE 1.

As seen in FIGURE 2, the portions of the rotors above a plane 27 common to their axes constitute in conjunction with the walls of the housing the compressor section of the unit. The length of the rotors and their pitch are chosen so that successive shoulders and grooves 20 and 22 in coming together form a gas seal between the upper and lower portions of the rotors, i.e. between the compressor and motor or expander portions. As seen in FIGURES 1 and 3, gas is admitted to the compressor portion of the unit through an inlet port 28 in the left end wall 30 of housing 12. This port is shaped substantially as shown so that the shoulders and grooves of the rotors in sweeping over the inner face of the port provide automatic opening and closing thereof as each successive shoulder moves past. Each volume of gas thus admitted through the inlet port is thereafter propelled axially along the rotors and is progressively compressed as they rotate together. At the far end of the unit, as seen also in FIGURE 4, this gas having been considerably compressed is discharged through an outlet port 32 in the rear wall 34 of the housing. This outlet port is similar to the inlet one but much smaller in area.

After leaving the outlet port, and as shown schematically in FIGURE 2, part of the compressed air is introduced via a duct 35 into a combustion chamber or burner 36. Here a suitable fuel, such as kerosene, supplied by a fuel line 38, is burned thus greatly raising the temperature of the air. This heated and compressed air is then returned via a duct 39 to the input end of the rotors and, see FIGURES 1 and 3, is admitted through an inlet port 40 to the motor or expander portion of the rotors. Since this portion is below the plane of their axes, the shoulders and grooves of the rotors in turning in the direction of arrows 24 and 26 move apart. Thus, the highly energized air is able to expand between the rotors thereby having its pressure and temperature lowered. The energy of the gas lost in this manner is imparted to the rotors and serves to drive them at a desired speed, overcoming both the resistance met by the portion of the rotors above the axial plane and losses due to friction and so forth.

The gas passing through the motor part of the unit, after giving up most of its energy, is exhausted through an outlet port 42 at the rear end of the rotors and via a duct 43 through a jet nozzle 44. The gas from compressor outlet port 32 not passing into the motor portion of the unit has considerable thrust energy and is exhausted via a duct 45 through a second jet nozzle 46 to propel the unit. Where additional thrust is needed the gas exhausted from nozzle 46 can be heated in an afterburner (not shown) before being exhausted from the nozzle.

FIGURE 5 is an enlarged longitudinal sectional view of unit 10 taken as indicated in FIGURE 3. The outer wall 48 of housing 12, indicated as relatively thick, is made of a honeycomb metal frame filled with a foamed ceramic material such as Eccofoam LM 43A, Emerson Cuming, Inc., Canton, Massachusetts. Similarly, rotors 14 and 16, which are hollow, have walls made from a honeycomb metal frame filled with foamed ceramic. The construction of male rotor 14 is illustrated in detail in FIGURES 6-9, the construction of female rotor 16 being generally identical.

Figure 6:
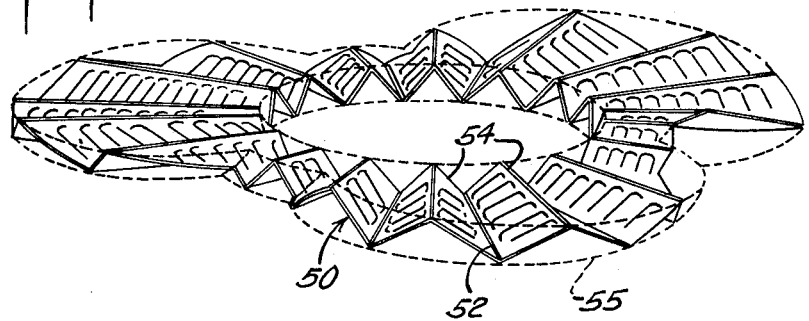
FIGURE 6 is a perspective view of one of the corrugated plates used in building-up a honeycomb skeleton for the male rotor in the unit.
Figure 7:
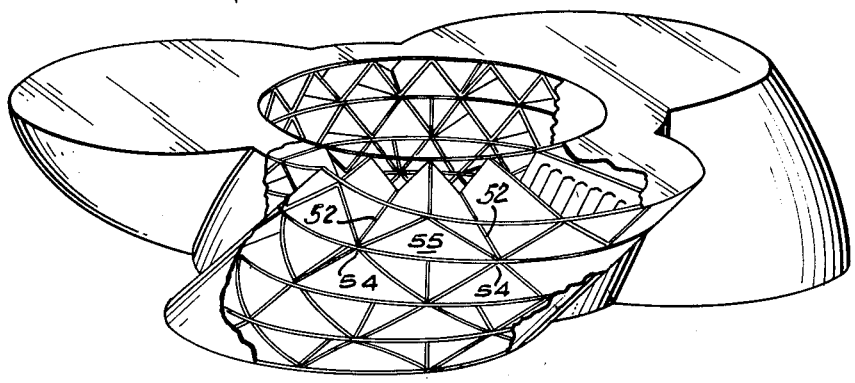
FIGURE 7 is a perspective view showing how the plates are stacked upon each other in skewed relation.
Figure 8:
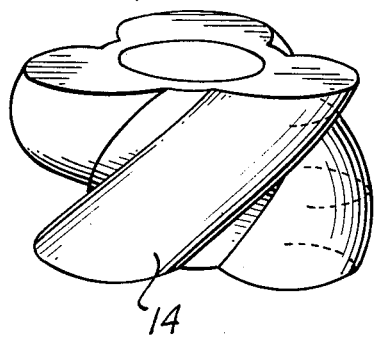
FIGURE 8 is a somewhat smaller perspective of a completed male rotor.
Figure 9:
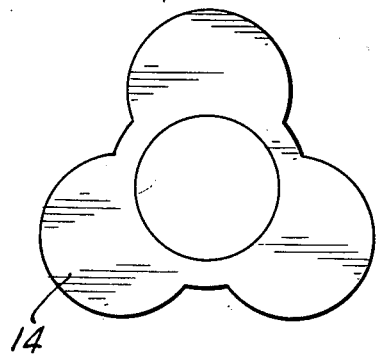
FIGURE 9 is an end view of this rotor.

FIGURE 6 shows a corrugated annular metal plate 50 whose edge is scalloped, as indicated in FIGURE 9, in accordance with the desired shape of a complete rotor, in this case male rotor 14. The corrugations of each plate 50 are dimensioned so that, as indicated in FIGURE 7, they can be stacked upon each other in skewed fashion, according to the desired pitch of the rotor, with the bottom lines of corrugation 52 of one plate fastened onto the top lines of corrugation 54 of the plate beneath, and so on. A flat plate 55 whose edge is scalloped, as indicated in FIGURE 9, is placed between the corrugated plates 52 and 54 so that, as seen in FIGURE 7, triangularly shaped pockets are formed to resist deformation both radially and axially with respect to the rotor center line. The corrugations of the plate shown in FIGURE 6 are impressed with a series of indentations or ridges to increase the stiffness of each corrugation for greater bending resistance. By using a sufficient number of plates, a rotor of desired length can easily be built up with a minimum of machining. After a skeleton such as illustrated in FIGURE 7 has been constructed it is filled with foamed ceramic to give a completed rotor, as shown in FIGURE 8.

As shown in FIGURE 5, the rotors carry on their right-hand end respective ones of the timing gears 56 and 58. For the unit illustrated male rotor 14 has three lobes and female rotor, five. Thus, the male rotor must make five revolutions for every three made by the female rotor. The timing gears insure that the rotors will operate in this relation, although it is possible to maintain a timing relationship simply by using the male rotor 16 and the female rotor 14 as timing gears themselves. Rotor 14 is rotatably supported in housing 12 by bearings 60 and 61 and similarly rotor 16 is supported by bearings 62 and 63.

Mounted within rotor 14 is a self-starting mechanism comprising a chamber 70 within which is mounted a rifle cartridge 72. This is adapted to be fired by an externally controlled firing pin 74, the bullet being stopped by a catcher 76 and the gas generated being diverted through a nozzle 78 onto turbine blades 80 mounted radially inside the rotor. This gas rushing past the turbine blades gives the rotors an initial spin after which they will rotate under their own power, as previously explained. Several chambers 70 may be used each with its own nozzle 78 so that several successive starts can be made without reloading.

To regulate the speed of the rotors, there is mounted on a shaft 82 inside of rotor 16 a governor 84. To the left of the governor and on the same shaft is a magneto 86, the two being driven in unison by fan-like spokes 88 whose tips are attached to the inside of the rotor and whose hub is fast on shaft 82. Extending to the right from the governor through end wall 34 is a linkage 90 which controls a butterfly valve 92 in duct 35 leading from compressor outlet port 32. This valve controls how much compressed gas is introduced into burner 36 and how much is directed to nozzle 46.

Advantages of a combined compressor-motor unit as described above are lower average operating temperature, and small size and lightweight for a given thrust output. Because gas entering the input end of the compressor portion of the rotors has a relatively low temperature, this counteracts the effect of the high temperature gas entering the input of the motor portion. Likewise, the relatively low temperature of the gas exhausted from the motor counteracts the somewhat elevated temperature of the gas in the compressor at that end. As the rotors 14 and 16 mesh together the gas volumes are sequentially exposed to hot and to cold gas thus maintaining a modest temperature and yet working with high temperature combustion gas.

For the 3:5 lobe arrangement as shown advantageous design values for the unit are as follows: tip diameter of male rotor 14, 8.5 in. and pitch diameter 4.72 in.; tip diameter of female rotor 7.72 in. and root diameter 3.94 in.; axial length of rotors 5.85 in. The pitch angle of the male rotor from input to output is 150° and for the female rotor, 90°. The pressure ratio from input to output of the compressor is approximately 7:1, and for the motor, roughly the reverse. Thus inlet port 28 has several times the area of outlet port 32, and inlet port 40 is about 1.2 times the size of port 32 to accommodate the heated and compressed gas. By virtue of the 3:5 lobe arrangement, the rotors are roughly of the same effective diameter. With an air flow of 4 lbs./sec. and a pitch line velocity of Mach 0.85, the rotors should operate at about 32,150 r.p.m. and 19,300 respectively. For a burner temperature of about 2100° F. and diverting about half of the air flow from the compressor burner 36 and the remainder to nozzle 46, a total thrust of about 190 lbs. is obtained. Using an afterburner in conjunction with nozzle 46, the thrust can be increased to about 350 lbs. Because of the small size of the unit, and by virtue of the unique operation and construction of the rotors, the total weight of such a unit including enough fuel for about ten minutes operation can be held to about fifty pounds.

The above description is intended in illustration and not in limitation of the invention. Various changes in the embodiment illustrated may occur to those skilled in the art and these can be made without departing from the spirit or scope of the invention as set forth.

I claim:

1. An improved thrust gas-jet engine comprising a housing, two rotors mounted in bearings in said housing, said rotors having mating screw-pitch shoulders and grooves and being mounted with their axes parallel so that said shoulders and grooves mesh upon rotation of said rotors, said grooves and shoulders separating said rotors into a first compressor portion and a second expander portion, said compressor and expander portions lying on opposite sides of a longitudinal plane generally common to the axes of said rotors, said portions being in gas-tight separation, an inlet port and an outlet port through said housing for said compressor portion, an inlet port and an outlet port through said housing for said expander portion, a combustion chamber, means to divert at least part of the gas from the outlet port of the compressor through said chamber and into the inlet port of said expander, and gas-jet nozzle means connected to the outlet ports of said compressor and expander portions, said means to divert including a throttle valve by means of which a substantial flow of the gas from the compressor portion is directed to said chamber and the remaining gas from said compressor portion is exhausted through said jet nozzle means, each rotor being formed by a shell with a hollow portion, one rotor containing a self-starting mechanism, the other rotor containing a speed control governor and control means for said throttle valve.

2. An improved thrust gas-jet engine comprising a housing, two rotors mounted in bearings in said housing, said rotors having mating screw-pitch shoulders and grooves and being mounted with their axes parallel so that said shoulders and grooves mesh upon rotation of said rotors, said grooves and shoulders separating said rotors into a first compressor portion and a second expander portion, said compressor and expander portions lying on opposite sides of a longitudinal plane generally common to the axes of said rotors, said portions being in gas-tight separation, an inlet port and an outlet port through said housing for said compressor portion, an inlet port and an outlet port through said housing for said expander portion, a combustion chamber, means to divert at least part of the gas from the outlet port of the compressor through said chamber and into the inlet port of said expander, and gas-jet nozzle means connected to the outlet ports of said compressor and expander portions, said means to divert including a throttle valve by means of which a substantial flow of the gas from the compressor portion is directed to said chamber and the remaining gas from said compressor portion is exhausted through said jet nozzle means, each rotor being formed by a shell with a hollow portion, one rotor containing means to start said engine and the other rotor containing means for controlling said throttle valve.

References Cited by the Examiner

UNITED STATES PATENTS

| | | | |
|---|---|---|---|
| 2,325,617 | 8/43 | Lysholm et al. | |
| 2,349,022 | 5/44 | Ungar et al. | 103—128 |
| 2,362,106 | 11/44 | Ungar et al. | 103—128 |
| 2,485,687 | 10/49 | Bailey | 123—12 |
| 2,766,928 | 10/56 | Jendrassik | 60—39.45 |
| 2,782,596 | 2/57 | Lindhagen et al. | 60—39.45 X |
| 2,804,260 | 8/57 | Nilsson et al. | 60—39.45 |
| 2,912,188 | 11/59 | Singelmann et al. | |
| 3,057,157 | 10/62 | Close | 60—39.43 |

FOREIGN PATENTS 720,956    12/54    Great Britain.

SAMUEL LEVINE, *Primary Examiner.*

JULIUS E. WEST, *Examiner.*